3,300,548
POLYOLEFINS CONTAINING COPOLYMERS OF ETHYLENE AND N-VINYL-N-HYDROCARBYL ACETAMIDES
Bernard O. Baum, Plainfield, N.J., and George M. Bryant, South Charleston, and Nathan L. Zutty, Charleston, W. Va., assignors to Union Carbide Corporation, a corporation of New York
No Drawing. Filed Nov. 2, 1961, Ser. No. 149,541
15 Claims. (Cl. 260—897)

This invention relates to new and valuable polyolefin compositions. More particularly, it is concerned with polyolefin compositions which can be used to produce fibers which are readily dyed by conventional dyeing techniques; films having improved printability; extrusions and moldings having improved stress-crack resistance; and as adhesives.

Fibers of polyolefinic resins, both homopolymeric and copolymeric, are well known. However, these fibers are very difficult to dye and, in general, defy dyeing by the conventional procedures. Several approaches have been taken in attempts to improve the dyeability of polyolefin resins; for example, graft polymerization with dye-receptive comonomers has been tried but this has affected the spinnability of the polymer and has not been commercially practical. Attempts have also been made to improve dyeability by blending the polyolefin with polyesters, polyurethanes, polyamides, epoxy resins, and the like—again, with little or no success. At most, these procedures have resulted in moderate improvements in dyeability but these improvements have been offset by other problems, such as poor compatibility, resulting in poor product uniformity and spinning problems. Further, the dyeings obtained have not been satisfactory in depth of shade or fastness properties. Films made from the polyolefin resins have been found to be difficult to print on, and expensive and time consuming procedures, such as flame treatment or radiation, have been employed to improve the printability properties of such films. Also in some instances it has been difficult to seal the edges of the films after such treatments.

It has now been found that olefinic polymers suitable for use in the production of fibers can be rendered dye-receptive by incorporating in them a minor amount of a particular class of modifying copolymers. It has also been found that films of improved printability can be produced from the blends herein contemplated. Further, the blends of this invention can be used to produce extruded and molded articles having improved stress-crack resistance properties; and in addition, it has been found that the blends are suitable for use as adhesives.

The olefinic polymers useful as starting materials in producing the blends of this invention are the homopolymers and copolymers produced from the mono-alpha-olefins containing from 2 to about 12 carbon atoms, preferably those containing from 2 to about 6 carbon atoms. Illustrative thereof one can mention polyethylene, polypropylene, polybutene-1, polyhexene-1, poly(4-methylpentene-1), poly(3-methylbutene-1), poly(5,5-dimethylhexene-1), the copolymer of ethylene and propylene, the copolymer of ethylene and 4-methylpentene-1, the copolymer of propylene and hexene-1, the copolymer of propylene and 4-methylpentene-1, the copolymer of 3-methylbutene-1 and 5-methylhexene-1, the copolymer of 3-methylbutene-1 and 4-methylpentene-1, the copolymer of allylcyclohexane and 4-cyclohexylbutene-1, the copolymer of allylcyclohexane and styrene, the copolymer of 1-allylnaphthalene and 2-vinylnaphthalene, the copolymer of 3-methylpentene-1 and 4-methylpentene-1, and the like, as well as terpolymers and tetrapolymers of mono-alpha-olefins. These polymers are produced by well known procedures, for example, the high pressure polymerization techniques and the low pressure polymerization techniques, and many of these polymers are commercially available products.

The modifying copolymers incorporated with the olefinic polymers to produce the blends of this invention are the copolymers of ethylene with an N-hydrocarbyl-N-vinyl acetamide. The modifying copolymers contain from about 0.5 percent to about 50 percent by weight of polymerized N-hydrocarbyl-N-vinyl acetamide in the copolymer. These modifying copolymers are produced by conventional high pressure polymerization processes which are well known to the ordinary scientist skilled in the art; for example, a mixture of the comonomers is polymerized at elevated pressures above about 15,000 p.s.i.g. and at elevated temperatures above about 40° C. in contact with a catayslt which is capable of forming free radicals under the polymerization conditions employed. Among the catalysts which can be used are oxygen; peroxidic compounds such as hydrogen peroxide, diethyl peroxide, dipropionyl peroxide, acetyl peroxide, perbenzoic acid, dibenzoyl peroxide, perlauric acid, peracetic acid, acetyl benzoyl peroxide, ditertiary buytl peroxide, tertiary butyl hydroperoxide, and so forth; azo type compounds such as disclosed in United States Patent 2,471,959, azo-bis-isobutyrylnitrile; the alkali metal and ammonium persulfates, perborates, and percarbonates; and the like.

The modifying copolymers contain from about 0.5 to about 50 percent by weight of polymerized N-hydrocarbyl-N-vinyl acetamide in the polymer chain; preferably the concentration is from about 5 to 40 percent by weight, with the most preferred concentration being from about 10 to 30 percent by weight. Among the N-hydrocarbyl-N-vinyl acetamides one can mention N-methyl-N-vinyl acetamide, N-ethyl-N-vinyl acetamide, N-propyl-N-vinyl acetamide, N-isopropyl-N-vinyl acetamide, N-pentyl-N-vinyl acetamide, N-2-ethylhexyl-N-vinyl acetamide, N-phenyl-N-vinyl acetamide, N-benzyl-N-vinyl acetamide, N-tolyl-N-vinyl acetamide, N-cyclohexyl-N-vinyl acetamide, and the like.

These compounds are represented by the formula

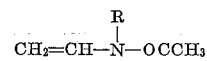

wherein R is a hydrocarbyl radical containing from 1 to about 12 carbon atoms, such as an alkyl radical, for example, ethyl, methyl, propyl, isopropyl, butyl, tertiary butyl, pentyl, hexyl, neohexyl, 2-ethylexyl, decyl, undecyl, dodecyl, and so forth; an aryl radical, for example, phenyl, naphthyl, and so forth; an alkaryl radical, for example, tolyl, xylyl, mesityl, methylnaphthyl, and so forth; an aralkyl radical, for example, benzyl, phenethyl, alpha mesityl, naphthyl, and so forth; or a cycloalkyl radical, for example, cyclohexyl, cyclopentyl, cyclobutyl, methylcyclopentyl, dimethylcyclohexyl, cycloheptyl, and so forth.

The compositions of this invention are produced by incorporating from about 1 percent to about 80 percent by weight of the modifying copolymer into the olefinic polymer; preferably the concentration of modifying copolymer is from about 2.5 percent to about 40 percent by weight, with the most preferred concentration being from about 5 percent to about 20 percent by weight.

The improved compositions of this invention are homogeneous blends and can be prepared by mixing the solid polymers in conventional mixing equipment such as dough mixers, roll mixers, or Banbury mixers; by extrusion; or by fluxing the solid polymers. If desired, solution mixing can be used by proper selection of solvents. During this blending procedure antioxidants, heat stabilizers, delusterants, and other known additives can be added to the compositions.

Fibers can be spun from the compositions of this invention by conventional spinning techniques; for example, the compositions can be melt spun or solution spun and the filaments can then be stretched to orient the molecules and develop the desired tensile properties in the fibers. The preferred compositions for fiber application are those containing from 2.5 percent to 40 percent by weight, preferably 5 percent to 20 percent by weight of the modifying copolymer in the blend. The fibers produced from the compositions of this invention can be employed in the many applications in which synthetic fibers are used. These fibers are more readily dyed by conventional dyeing techniques to shades which are much deeper than have heretofore been obtainable on polyolefin fibers. Among the dyes that can be used are the well known acid dyes, disperse dyes, soluble vat dyes, azoic dyes, premetallized dyes, and the like. In a typical dyeing procedure with the acid dyes and premetallized dyes, a 50 to 1 dye bath ratio can be used, the bath containing 1 percent by weight of a methyl polyethanol quaternary amine, 2 percent sulfuric acid, and 3 percent of the dye, all based on the weight of the fiber. The dyeing is carried out for ninety minutes at the boil and the fiber is then rinsed, scoured, and dried. When a disperse dye is used, a typical dye bath contains 1 percent sodium N-methyl-N-oleoyl taurate, 2 percent of disperse dye, a dye bath ratio of about 40 to 1, and a one hour boiling period.

The amount of dye on the fiber, or the depth of color, is approximately proportional to the K/S value, which is a measure of the light reflected from the dyed sample. The larger the K/S value, the deeper the shade, and a K/S value of 20 indicates that the shade is approximately twice as deep as the shade represented by a K/S value of 10. The determination of the K/S values is set forth in an article by D. B. Judd, "Color in Business," Science and Industry, 1952, pages 314 to 342. Among the dyes that can be used to dye the fibers of this invention are the following:

ACID

| Yellow: | C.I. |
|---|---|
| 1 | 10316 |
| 3 | 47005 |
| 7 | 56205 |
| 11 | 18820 |
| 23 | 19140 |
| 29 | 18900 |
| 36 | 13065 |
| 42 | 22910 |
| 54 | 19010 |
| 99 | 13900 |

| Orange: | |
|---|---|
| 1 | 13090/1 |
| 7 | 15510 |
| 10 | 16230 |
| 24 | 20170 |
| 49 | 23260 |
| 72 | 18740 |
| 74 | 18745 |

| Red: | C.I. |
|---|---|
| 1 | 18050 |
| 12 | 14835 |
| 14 | 14720 |
| 26 | 16150 |
| 34 | 17030 |
| 37 | 17045 |
| 73 | 27290 |
| 85 | 22245 |
| 89 | 23910 |
| 115 | 27200 |
| 116 | 26660 |
| 134 | 24810 |
| 179 | 19351 |

| Violet: | |
|---|---|
| 1 | 17025 |
| 7 | 18055 |
| 17 | 42650 |
| 43 | 60730 |

| Blue: | |
|---|---|
| 1 | 42045 |
| 9 | 42090 |
| 22 | 42755 |
| 25 | 62055 |
| 59 | 50315 |
| 83 | 42660 |
| 102 | 50320 |

| Green: | |
|---|---|
| 1 | 10020 |
| 3 | 42085 |
| 16 | 44025 |
| 20 | 20495 |
| 50 | 44090 |

| Brown: | |
|---|---|
| 14 | 20195 |
| 42 | 14251 |

| Black: | |
|---|---|
| 1 | 20470 |
| 24 | 26370 |
| 48 | 65005 |
| 52 | 15711 |

DISPERSE

| Yellow: | C.I. |
|---|---|
| 1 | 10345 |
| 3 | 11855 |
| 31 | 48000 |

| Orange: | |
|---|---|
| 1 | 11080 |
| 3 | 11005 |
| 7 | 11240 |

| Red: | |
|---|---|
| 1 | 11110 |
| 4 | 60755 |
| 11 | 62015 |
| 13 | 11115 |
| 15 | 60710 |
| 17 | 11210 |

| Violet: | |
|---|---|
| 1 | 61100 |
| 4 | 61105 |
| 8 | 62030 |
| 13 | 11195 |

| Blue: | |
|---|---|
| 1 | 64500 |
| 3 | 61505 |
| 7 | 62500 |

| Black: | |
|---|---|
| 1 | 11365 |
| 7 | 11035 |

AZOIC DIAZO COMPONENTS

| Diazo: | C.I. |
|---|---|
| 1 | 37135 |
| 2 | 37005 |
| 3 | 37010 |
| 4 | 37210 |
| 5 | 37125 |
| 6 | 37025 |
| 8 | 37110 |
| 10 | 37120 |
| 13 | 37130 |
| 20 | 37175 |
| 28 | 37151 |
| 32 | 37090 |
| 34 | 37100 |
| 35 | 37255 |
| 38 | 37190 |
| 41 | 37165 |
| 44 | 37000 |
| 48 | 37235 |

AZOIC COUPLING COMPONENTS

| Coupling: | C.I. |
|---|---|
| 2 | 37505 |
| 3 | 37575 |
| 5 | 37610 |
| 7 | 37565 |
| 10 | 37510 |
| 12 | 37550 |
| 13 | 37595 |
| 14 | 37558 |
| 17 | 37515 |
| 20 | 37530 |
| 29 | 37527 |
| 34 | 37531 |
| 36 | 37585 |

SOLUBLE VAT

| Yellow: | C.I. |
|---|---|
| 2 | 67301 |
| 4 | 59101 |
| 5 | 56006 |

| Orange: | |
|---|---|
| 1 | 59106 |
| 2 | 59706 |
| 5 | 73336 |

| Red: | |
|---|---|
| 1 | 73361 |
| 10 | 67001 |

| Violet: | |
|---|---|
| 1 | 60011 |
| 2 | 73386 |
| 3 | 73396 |

| Blue: | |
|---|---|
| 1 | 73002 |
| 5 | 73066 |
| 6 | 69826 |
| 7 | 70306 |

| Green: | |
|---|---|
| 1 | 59826 |
| 2 | 59831 |
| 3 | 69501 |

| Brown: | |
|---|---|
| 1 | 70801 |
| 3 | 69016 |
| 5 | 73411 |

| Black: | |
|---|---|
| 1 | 73671 | and the like. The Colour Index numbers are those listed in the latest Colour Index.

The compositions of this invention are readily extruded by conventional procedures to produce rods, films, and protective coatings. The films so obtained are amenable to printing by conventional procedures without any further surface treatment of the film being necessary. The films can also be used to form an adhesive bond or layer on one or more sides of a substrate, or as the middle layer in the production of laminates. If one wishes, one can produce the laminate by spreading pellets of the compositions of this invention between the surfaces of the two materials which are to be laminated and then heating the composite under pressure.

The modifying copolymers added to the olefinic polymers to produce the compositions of this invention are readily compatible with the olefinic polymers and relatively clear, tough compositions are obtained. These blends show little sweat-out on heating, good product uniformity, improved printability and adhesion, reduced fibrillation, and many other desirable properties.

The properties of the compositions of this invention were determined using the following test procedures:

Stress-crack resistance

A 125 mil compression molded plaque, 0.5 by 1.5 inches, is slit along the long dimension in the center of the plaque. This slit is 20 mils deep and 75 mils long. The specimen is bent into a U form and held in this bent form in a channel. Twenty such specimens are immersed at 50° C. in a synthetic detergent, alkyl phenoxy polyoxyethylene ethanol, and the time of failure (which is the appearance of a crack perpendicular to the slit) of any one specimen was observed. The time of failure of 50 percent of the specimens is the value reported as $F_{50}$.

Adhesion to wood, glass, and steel

A small pellet of the polymer composition is placed between two sheets of the substrate. The entire assembly is placed on a hot plate and compressed with a 50-gram weight. Adhesion is determined by measuring the force necessary to pry the samples apart.

Adhesion to epoxy, vinylidene chloride/vinyl chloride copolymer, and vinyl alcohol/trimethylolphenol copolymer A two inch square sample of a film of the polymer composition is placed on a clean sheet of metal and melted over a hot plate to form a uniform assembly. A solution of the epoxy resin and hardener therefor, the vinylidene chloride/vinyl chloride copolymer in carbon tetrachloride, or of the vinyl alcohol/trimethylolphenol copolymer in alcohol is brushed onto the previously prepared metal plate and the sample is baked for one hour at 100° C. Regenerated cellulose tape is then applied to the baked coating and peeled off. The degree of adhesion is determined by whether or not the coating applied to the prepared metal plate is stripped off by the regenerated cellulose tape ("Scotch" tape).

Melt index—A.S.T.M. D1238–52T

Density—A.S.T.M. 1505–57T

Tenacity, elongation, and stiffness modulus—Measured on an Instron Tensile Tester using a modified A.S.T.M. D1380–55T procedure in which a ten-inch yarn specimen is elongated at a rate of 60 percent per minute. The stiffness modulus is calculated as 100 times the stress at 1 percent elongation.

In the following examples, which are not to be construed as limiting the invention in any manner whatsoever, parts are by weight unless otherwise indicated.

EXAMPLE 1

A copolymer was produced by polymerizing a mixture of 83 percent by weight of ethylene and 17 percent by weight of N-methyl-N-vinyl acetamide. The polymerization was carried out in a stirred autoclave at 15,000 p.s.i.g. and at 70° C. using one gram of azo-bis-isobutyronitrile as catalyst. The autoclave contained 400 grams of water and 200 grams of butanol as diluent. After 1.58 hours there was recovered 62 grams of an ethylene/N-methyl-N-vinyl acetamide copolymer having a melt index of 0.26 dgm./min., a density of 0.931 g./cc., and a specific viscosity at 80° C. of 0.477. The specific viscosity was determined at 80° C. from a solution containing 0.4 gram of copolymer per hundred milliliters of methylcyclohexane. The copolymer contained 19.8 percent polymerized N-methyl-N-vinyl acetamide.

Ten parts of the above copolymer and 90 parts of polypropylene having a melt index of 4.0 dgm./min. and a density of 0.906 g./cc. were milled together on a heated roll mill at 170° C. The blending was readily accomplished and there was no sign of incompatibility of the two resins. The blended composition was transferred to an extruder and the polymer blend was melt spun at 270° C. through a spinnerette having fifteen holes, each 0.030 inch in diameter. The orifice velocity was twenty feet per minute and the take-up velocity was 550 feet per minute. The multi-filament yarn was then stretched 440 percent in a steam atmosphere (Yarn I). A control yarn (Yarn II) was spun in the same manner for comparison purposes, using the same unmodified polypropylene. The properties of the two yarns are summarized below:

| Yarn | I | II |
|---|---|---|
| Tenacity, g.p.d. | 4.3 | 5.2 |
| Elongation, percent | 32 | 49 |
| Stiffness Modulus, g.p.d. | 46 | 53 |
| Shrinkage, percent boiling water | 7.7 | 7 |

Samples of fabric knitted from each of the above yarns were dyed by the procedures previously indicated. In all instances the fabrics produced from Yarn II showed negligible dyeability, which appeared to be nothing more than a stain on the fabric. The fabrics from Yarn I were dyed medium-deep to deep shades. The dyes employed were Disperse Yellow 31 (Celliton Fast Yellow 7 GA–CF, C.I. No. 48000), Latyl Blue FL, Disperse Blue 3 (Artisil Direct Blue BSQ, C.I. No. 61505), Disperse Red 15 (Celliton Fast Pink BA–CF, C.I. No. 60710), and Eastone Fast Red N–GLF.

In similar manner blends of polypropylene with a copolymer of ethylene and N-ethyl-N-vinyl acetamide or a copolymer of ethylene and N-phenyl-N-vinyl acetamide produce filaments which are dyeable to deeper shades than polypropylene per se.

EXAMPLE 2

A copolymer was produced by polymerizing a mixture of 85 percent ethylene and 15 percent N-methyl-N-vinyl acetamide. The polymerization was carried out at 140° C. and 35,000 p.s.i.g. in contact with 0.789 gram of azo-bis-isobutyronitrile as catalyst. This produced 468 grams of an ethylene/N-methyl-N-vinyl acetamide copolymer containing 17.6 percent by weight of the N-methyl-N-vinyl acetamide monomer copolymerized therein and having a melt index of 0.425 dgm./min., a density of 0.929 g./cc., and a specific viscosity of 0.534.

A blend was prepared by roll milling, at 170° C., 6.7 parts of the above copolymer with 93.3 parts of polypropylene having a melt index of 4.0 dgm./min. and a density of 0.906 g./cc. Multifilament yarn was produced from the blend by conventional procedures. The yarn was produced at a spinning temperature of 280° C., an orifice velocity of 20 feet per minute, and a take-up velocity of 600 feet per minute (Yarn III).

A second blend was prepared by roll milling, at 170° C., 13.3 parts of the above copolymer and 86.7 parts of the same polypropylene used above, and multifilament yarns were produced from this blend (Yarn IV).

A third blend was prepared by roll milling, at 170° C., 10 parts of polyethylene having a melt index of 2.0 dgm./min. and a density of 0.918 g./cc., with 90 parts of the same polypropylene used above, and multifilament yarns were prepared therefrom (Yarn V).

In the table below the amount of steam stretch imparted and the properties of the yarns are set forth.

| Yarn | III | IV | V |
|---|---|---|---|
| Steam Stretch, percent | 260 | 280 | 326 |
| Tenacity, g.p.d. | 3.3 | 3.1 | 3.9 |
| Elongation, percent | 51 | 66 | 71 |
| Stiffness Modulus, g.p.d. | 29 | 22 | 28 |
| Boiling water shrinkage, percent | 9.4 | 12.4 | 10.4 |

When dyed with Disperse Red 17 (Celliton Fast Red GGA, C.I. No. 11210), Yarns III and IV showed that a substantial amount of dye had been absorbed by the fibers. Yarn V was stained by the dye. A visual comparison of the dyeings clearly showed the improved dyeability of Yarns III and IV over that of Yarn V. Additional dyeing tests were performed with Yarns IV and V and the K/S values were determined. In all instances the superiority of the dyeability of Yarn IV over that of Yarn V was clearly evident.

| | K/S Values | |
|---|---|---|
| Yarn | IV | V |
| Acid Dyes: | | |
| Acid Blue 25 (C.I. 62055) | 4.4 | 0.7 |
| Acid Red 116 (C.I. 26660) | 6.5 | 0.8 |
| Acid Orange 1 (C.I. 13090) | 11.8 | 1.1 |
| Disperse Dyes: | | |
| Disperse Blue 3 (C.I. 61505) | 32.4 | 8.6 |
| Disperse Red 15 (C.I. 60710) | 24.0 | 2.0 |

EXAMPLE 3

A copolymer was produced by polymerizing a mixture of about 74 percent of ethylene, 26 percent by weight of N-methyl-N-vinyl acetamide, and 0.0012 percent of ditertiary butyl peroxide as catalyst. Polymerization was carried out at 180° C. and 35,000 p.s.i.g. for 0.5 hour in a continuous tubular reactor. There was produced a copolymer containing 17.7 percent copolymerized N-methyl-N-vinyl acetamide and having a melt index of 41 dgm./min., a density of 0.923 g./cc., and a specific viscosity of 0.284.

A blend was prepared by roll milling 10 grams of the above copolymer with 90 grams of poly(4-methyl-1-pentene) which had a melt index at 270° C. of 14.5 dgm./min. and a density of 0.84 g./cc. The blend was melt extruded by conventional procedures to produce multifilament yarn. Melt spinning was carried out at a temperature of 270° C., an orifice velocity of 3 ft./min., and a take-up velocity of 150 ft./min. The spinnerette used had fifteen holes each 0.030 inch. The multifilament yarn had a sticking temperature of 227° C. as compared with 229° C. for the poly(4-methyl-1-pentene). The multifilament yarns produced from the blend were dyed medium-deep shades with Disperse Red 17 and Acid Orange 1. The controlled dyeings on unmodified poly(4-methyl-1-pentene) multifilament yarns showed staining with Disperse Red 17 and no dyeability whatsoever with Acid Orange 1.

EXAMPLE 4

An ethylene/N-methyl-N-vinyl acetamide copolymer was produced in the manner described in Example 1. The copolymer containing 14.9 percent copolymerized N-methyl-N-vinyl acetamide and had a melt index of 4.9 dgm./min., a density of 0.926 g./cc., and a specific viscosity of 0.372.

A blend was prepared by roll milling 10 grams of the above copolymer with 90 grams of polyethylene having a density of 0.96 g./cc. and a melt index of 5.5 dgm./min. The blend was melt extruded by conventional procedures to produce multifilament yarn. Melt spinning was carried out at 280° C., an orifice velocity of 22.5 ft./min., and a take-up velocity of 550 ft./min. The spinnerette used had fifteen holes, each 0.030 inch (Yarn VI). A control yarn (Yarn VII) was spun in the same manner for comparison purposes, using the same unmodified polyethylene. The properties of the two yarns are summarized below:

| Yarn | VI | VII |
|---|---|---|
| Tenacity, g.p.d | 4.62 | 5.13 |
| Elongation, percent | 13.9 | 14.3 |
| Stiffness Modulus, g.p.d | 53.1 | 60.3 |

Samples of each of the above multifilament yarns were dyed with Disperse Red 17. Yarn VI was dyed a deep red shade and had a K/S value of 7.7; Yarn VII was merely stained and the K/S value was 0.2.

EXAMPLE 5

A blend was prepared by mixing 10 parts of an ethylene/N-methyl-N-vinyl acetamide copolymer having a density of 0.930 g./cc. and a melt index of 6.2 dgm./min., and 21 percent copolymerized N-methyl-N-vinyl acetamide therein with 88.7 parts of polypropylene having a density of 0.91 g./cc. and a melt index of 4.0 dgm./min. and 0.5 part of an A-stage phenol-formaldehyde resin, 0.5 part of diphenyl pentaerythritol diphosphite, and 0.3 part of a commercially available benzotriazole type ultraviolet light adsorber, per 100 parts of blend. The copolymer was produced in a continuous tubular reactor as described in Example 3. The blend was melt spun by conventional procedures to produce multifilament yarn (Yarn VIII). Melt spinning was carried out at 280° C., an orifice velocity of 16.6 ft./min., a take-up velocity of 6,000 ft./min., and a steam-stretch of 170 percent. The spinnerette used had fifteen holes, each 0.030 inch. The multifilament yarn had a tenacity of 4.16 g.p.d., an elongation of 33.8 percent, a stiffness modulus of 36.8 g.p.d., and a sticking temperature of 147° C.

The yarns were dyed with the following premetallized acid dyes to medium to deep shades: Nyalon Red B, Vialon Fast Red B, Vialon Fast Orange R, Cibalon Yellow 2BRL, Vialon Fast Yellow R, Vialon Fast Violet B, Vialon Fast Navy Blue R, Cibalon Blue BL, Vialon Fast Brown R, and Vialon Fast Blue Grey B. The unmodified control yarns (Yarn IX) were barely stained.

The yarns were also dyed with soluble vat dyes. These dyeings were carried out using a dye bath having a 50 to 1 ratio and containing 2 percent of the dye, 0.5 percent of the sodium sulfate derivative of 7-ethyl-2-methyl-undecanol, and 10 percent sodium chloride, all based on the weight of the fiber. A 5 gram sample of yarn was added, and the temperature was raised to the boil and held for thirty minutes. One percent sulfuric acid and 20 percent sodium nitrite were added in three equal portions over a thirty minute period and then boiled for another thirty minutes. Total dyeing time was ninety minutes. The yarn was then rinsed, scoured, rinsed, and dried. Soluble Vat Red 10 (C.I. 67001), Soluble Vat Violet 1 (C.I. 60011), Soluble Vat Green 3 (C.I. 69501), and Soluble Vat Brown 1 (C.I. 70801) all gave medium to deep shades on Yarn VIII, whereas the control Yarn IX was dyed only to light shades.

EXAMPLE 6

A blend was prepared by fluxing on a roll mill a mixture of 80 parts of polyethylene having a density of 0.92 g./cc. and a melt index of 2.0 dgm./min. and 20 parts of a 77.1/22.9 percent by weight copolymer of ethylene/N-methyl-N-vinyl acetamide having a density of 0.944 g./cc. and a melt index of 0.47 dgm./min. The blend was readily extruded by conventional procedures to produce films. The blends were then tested for stress-crack resistance properties and adhesion to various substrates. For control purposes the same polyethylene homopolymer used in preparing the blend was used. The results are tabulated below:

| | Blend | Control |
|---|---|---|
| Stress cracking, hrs. to F$_{50}$ | Over 500 | 2. |
| Adhesion to: | | |
| Wood | E | P. |
| Glass | E | P. |
| Epoxy resin* | E | P. |
| Vinylidene chloride/vinyl chloride copolymer | G | P. |
| Vinyl alcohol/trimethylolphenol copolymer | E | P. |

*Solid condensation product of the diglycidyl ether of bisphenol A hardened with diethylene tetraamine.
E—Excellent adhesion.
G—Good adhesion.
P—Poor adhesion.

EXAMPLE 7

A blend was prepared as described in Example 6, using an 85/15 ethylene/N-ethyl-N-vinyl acetamide copolymer which had a melt index of 0.26 dgm./min. and a density of 0.950 g./cc. The blend had a stress-crack resistance of over 500 hours to F$_{50}$ compared to two hours for the control. Adhesion to wood and glass was good as compared to poor for the control.

EXAMPLE 8

A blend was prepared as described in Example 6, using an 82/18 ethylene/N-phenyl-N-vinyl acetamide copolymer which had a melt index of 3.4 dgm./min. and a density of 0.947 g./cc. The blend had a stress-crack resistance of over 500 hours to F$_{50}$ compared to two hours for the control. The adhesion to wood and glass was about equal to that of the blend of Example 7.

EXAMPLE 9

A blend was prepared as described in Example 6, using 80 parts of polyethylene having a density of 0.945 g./cc. and a melt index of 1.0 dgm./min. and 20 parts of the 77.1/22.9 ethylene/N-methyl-N-vinyl acetamide copolymer. The blend showed good adhesion to wood, whereas the unmodified polyethylene, used as control, had poor adhesion to wood.

EXAMPLE 10

A blend was prepared as described in Example 6, using 80 parts of polyethylene having a density of 0.960 g./cc. and a melt index of 0.6 dgm./min. and 20 parts of the 77.1/22.9 ethylene/N-methyl-N-vinyl acetamide copolymer. The blend showed good adhesion to wood, whereas the unmodified polyethylene, used as control, had poor adhesion to wood.

EXAMPLE 11

A blend was prepared as described in Example 6, using 80 parts of polypropylene having a density of 0.90 g./cc. and a melt index of 2.6 dgm./min. and 20 parts of the 77.1/22.9 ethylene/N-methyl-N-vinyl acetamide copolymer. The blend showed good adhesion to wood, whereas the unmodified polypropylene, used as control, had poor adhesion to wood.

EXAMPLE 12

A blend was prepared as described in Example 6, using 80 parts of a 90/10 ethylene/propylene copolymer having a density of 0.92 g./cc. and a melt index of 1.2 dgm./min. and 20 parts of the 77.1/22.9 ethylene/N - methyl - N-vinyl acetamide copolymer. The blend showed good adhesion to wood, whereas the unmodified ethylene/propylene copolymer, used as control, had poor adhesion to wood.

EXAMPLE 13

A series of blends was prepared as described in Example 6 to show that the ethylene/N - methyl - N - vinyl acetamide copolymers used to produce the compositions of this invention can vary broadly in melt index and N-methyl-N-vinyl acetamide content. The blends showed good to excellent adhesion and greatly improved stress-crack resistance properties and were suitable for fiber production. In all instances the blend was prepared using 80 parts of polyethylene having a density of 0.92 g./cc. and a melt index of 2 dgm./min. and 20 parts of the ethylene/N-methyl-N-vinyl acetamide copolymer.

| Run | a | b | c | d | e | Control |
|---|---|---|---|---|---|---|
| Ethylene/N-methyl-N-vinyl acetamide: | | | | | | |
| Melt index, d.g.m./min | 1.8 | 4.7 | 9.2 | 20 | 557 | -------- |
| N-methyl-N-vinyl acetamide, content, percent | 10 | 22.9 | 44 | 22.9 | 25 | 0 |
| Stress cracking, hrs. to F₅₀ | 500 | 500 | 500 | -------- | -------- | 2 |
| Adhesion to: | | | | | | |
| Wood | G | E | E | -------- | -------- | P |
| Glass | G | E | E | E | -------- | P |

EXAMPLE 14

A series of blends was prepared as described in Example 6 varying the amount of the 77.1/22.9 ethylene/N-methyl-N-vinyl acetamide copolymer in the blend. In all instances the stress-crack resistance and adhesion were better than that of the control, which was the same polyethylene homopolymer used to prepare the blends.

| Run | a | b | c | d | e | Control |
|---|---|---|---|---|---|---|
| Polyethylene, percent by wt | 99 | 95 | 90 | 80 | 20 | 100 |
| Melt index, d.g.m./min | 2.0 | 2.0 | 2.0 | 2.0 | 2.0 | 2.0 |
| Density, g./cc | 0.92 | 0.92 | 0.92 | 0.92 | 0.92 | 0.92 |
| Ethylene/N-methyl-N-vinyl acetamide copolymer, percent by wt | 1 | 4 | 10 | 20 | 80 | 0 |
| Adhesion to: | | | | | | |
| Wood | -------- | F | G | E | E | P |
| Glass | -------- | F | G | G | E | P |
| Stress cracking, hrs. to F₅₀ | 50 | 230 | Over 500 | Over 500 | Over 500 | 2 |

EXAMPLE 15

A blend was prepared by roll milling at 170° C. 10 parts of an ethylene/N - methyl - N - vinyl acetamide copolymer having about 20 percent copolymerized N-methyl-N-vinyl acetamide therein with 90 parts of polypropylene having a melt index of about 4 dgm./min. and 0.5 part of an A-stage phenol-formaldehyde resin, 0.5 part of diphenyl pentaerythritol diphosphite, and 0.3 part of an ultraviolet absorber. The blend was melt spun by conventional procedures using a spinnerette having 182 holes, each 0.040 inch. Melt spinning was carried out at 290° C., at a rate of approximately three pounds per hour. The yarn was crimped and processed into four inch staple (Yarn X). This procedure was used to produce staple yarn from the same polypropylene used in preparing the blend (Yarn XI). The staple fibers were then processed to carpet yarns. The carpet yarns from Yarn X were readily skein dyed to deep shades, whereas those from Yarn XI were not dyed. Several of the dyes used were Vialon Fast Yellow R, Vialon Fast Violet B, and Vialon Fast Brown R.

A striped carpet was woven from Yarn X in which one stripe was gold dyed Yarn X, one stripe was undyed Yarn X, and the third stripe was brown dyed Yarn X with polypropylene yarns forming the warp of the woven fabric. After staining with coffee, blood, "Coca-Cola," tobacco, catsup, butter, and machine grease, the carpet was readily cleaned by conventional cleaning procedures. Washfastness, fastness to cleaning, crocking, resistance to staining and gas-fading, and lightfastness of the dyed areas were good. A portion of the undyed woven carpet was readily dyed brown, with the warp remaining undyed.

What is claimed is:

1. A composition comprising a blend of (A) from about 20 to 99 percent by weight of a polyolefin and (B) from about 1 to 80 percent by weight of a copolymer of ethylene and a member selected from the group consisting of the N-hydrocarbyl-N-vinyl acetamides, said copolymer containing in the copolymer molecule from about 0.5 to 50 percent by weight of said N - hydrocarbyl - N-vinyl acetamide copolymerized therein.

2. A composition comprising a blend of (A) from about 60 to 97.5 percent by weight of a polyolefin and (B) from about 2.5 to 40 percent by weight of a copolymer of ethylene and a member selected from the group consisting of the N - hydrocarbyl - N - vinyl acetamides, said copolymer containing in the copolymer molecule from about 5 to 40 percent by weight of said N - hydrocarbyl-N-vinyl acetamide copolymerized therein.

3. A composition comprising a blend of (A) from about 80 to 95 percent by weight of a polyolefin and (B) from about 5 to 20 percent by weight of a copolymer of ethylene and a member selected from the group consisting of the N - hydrocarbyl - N - vinyl acetamides, said copolymer containing in the copolymer molecule from about 10 to 30 percent by weight of said N - hydrocarbyl-N-vinyl acetamide copolymerized therein.

4. The composition of claim 1, wherein component (A) is polyethylene and component (B) is a copolymer of ethylene and N-methyl-N-vinyl acetamide.

5. The composition of claim 1, wherein component (A) is polyethylene and component (B) is a copolymer of ethylene and N-ethyl-N-vinyl acetamide.

6. The composition of claim 1, wherein component (A) is polyethylene and component (B) is a copolymer of ethylene and N-phenyl-N-vinyl acetamide.

7. The composition of claim 1, wherein component (A) is polypropylene and component (B) is a copolymer of ethylene and N-methyl-N-vinyl acetamide.

8. The composition of claim 1, wherein component (A) is a copolymer of ethylene and propylene and component (B) is a copolymer of ethylene and N - methyl - N - vinyl acetamide.

9. The composition of claim 1, wherein component (A) is poly(4-methylpentene-1) and component (B) is a copolymer of ethylene and N - methyl - N - vinyl acetamide.

10. The composition of claim 1 in the form of a film.

11. The composition of claim 2 in the form of a filament.

12. The composition of claim 3 in the form of a filament.

13. The composition of claim 4 in the form of a filament.

14. The composition of claim 7 in the form of a filament.

15. The composition of claim 9 in the form of a filament.

References Cited by the Examiner
UNITED STATES PATENTS

| | | | |
|---|---|---|---|
| 2,225,604 | 12/1940 | Lubs | 18—54 |
| 2,643,990 | 6/1953 | Ham | 260—895 |
| 2,921,831 | 1/1960 | Sommar | 18—54 |
| 3,049,508 | 8/1962 | Stanton et al. | 8—55 |

MURRAY TILLMAN, *Primary Examiner.*

LEON J. BERCOVITZ, *Examiner.*

J. A. KOLASCH, G. F. LESMES, *Assistant Examiners.*